Jan. 28, 1930.  F. E. WELLMAN  1,745,200
STUFFING BOX FOR PRESSURE STILLS
Original Filed June 5, 1922

Frank E. Wellman, Inventor

By Edward E. Clement, Attorney

Patented Jan. 28, 1930

1,745,200

UNITED STATES PATENT OFFICE

FRANK E. WELLMAN, OF KANSAS CITY, KANSAS, ASSIGNOR TO KANSAS CITY GASOLINE COMPANY, OF KANSAS CITY, KANSAS, A CORPORATION OF KANSAS

STUFFING BOX FOR PRESSURE STILLS

Application filed June 5, 1922, Serial No. 566,054. Renewed July 11, 1929.

My invention relates to stuffing boxes, and has special reference to devices of this character as applied to pressure stills for the treatment of hydrocarbon oils. Its application is however not limited to such use, as will sufficiently appear hereinafter.

The invention has for its object the production of a stuffing box that will resist high pressures without substantial leakage. I attain my object by making the stuffing box in two halves, or in effect two tandem stuffing boxes, with one end exposed to the main source of pressure, and the intermediate space between them exposed through a suitable pressure conveying passage to the same pressure. In the case of an oil still, the intermediate pressure pipe is connected to the still, and takes the same pressure to which the stuffing box is exposed, the pipe containing by preference a condenser, so that only relatively cool oil passes to the intermediate portion of the stuffing box.

My invention is illustrated in the accompanying drawing, in which.

Figure 1:
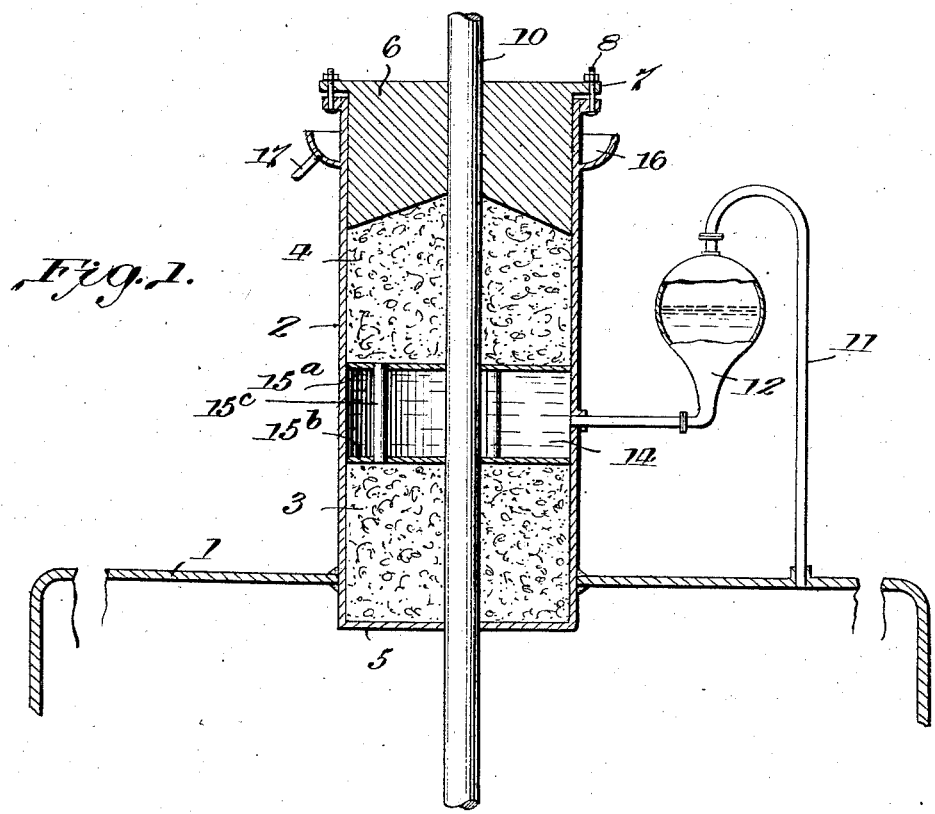
Fig. 1 is a section of a portion of a still with the stuffing box attached.
Figure 2:
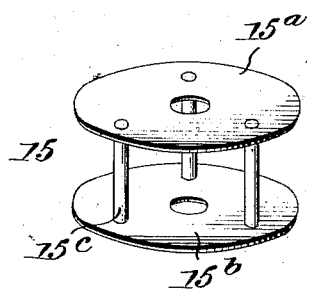
Fig. 2 is a detail view of a spacer for the intermediate pressure chamber therein.

Referring to the drawing, 1 is the top of a still, 2 is the cylindrical jacket of the stuffing box screwed or welded or otherwise secured to the wall 1, with an integral bottom 5, centrally perforated for the passage of the shaft 10, which typifies any suitable mechanical element that may be operated through a stuffing box, as for example the operating rod of an indicator or pressure regulator or feed device. 3 and 4 represent the packing, in two sections separated by a spacer 15 having two heads $15^a$ and $15^b$ held apart by rods $15^c$, the effect of this construction being to maintain an open chamber 14 between the packing sections. Compression is secured by means of a gland 6 having a flange 7 drawn down by bolts 8 welded or otherwise secured to the end of the jacket 2.

A pipe 11 carries pressure from the still 1 to the space 14, being preferably provided with an interposed condenser 12, by means of which oil vapors carried over through pipe 11 will be cooled and condensed, so that only relatively cold oil will make its appearance in chamber 14.

The operation of the device will be clear from this description. The pressure supplied to chamber 14 equalizes that upon the inner end of the inner stuffing box, and any leakage through the outer stuffing box will be of cold oil, in negligible quantity and incapable of doing any damage.

In actual practice, with a $1\frac{1}{8}''$ shaft and approximately 100 pounds pressure at approximately 750° F., the leakage was less than a gallon per hour, and the temperature thereof so low that it would not burn the skin.

In order to prevent the leakage from running down over the still, I provide a trough or catch-basin 16, below the gland, with a drain pipe 17, and shall claim the same as part of my invention.

I claim:

In combination, a pressure oil still, a stuffing box having one end attached to said still, two separated sections of packing in said box with mechanical pressure transmitting means between them, means for exerting pressure upon said two sections of packing and said mechanical pressure transmitting means, in tandem, a shaft passing through said box and through the wall of the still, a condenser, and a vapor pipe from said still to the condenser, with a pipe from the bottom or drainage point of said condenser to the interior of the stuffing box, opening into the space between the sections of packing, whereby the same pressure as that of the still is exerted within the stuffing box, through liquid condensate, from the condenser.

In testimony whereof I hereunto affix my signature.

FRANK E. WELLMAN.